US 9,870,361 B2

(12) United States Patent
Fenech et al.

(10) Patent No.: US 9,870,361 B2
(45) Date of Patent: Jan. 16, 2018

(54) GEO-LOCATE SYSTEM AND TECHNIQUE

(71) Applicant: VoiceByte Enterprises PTY LTD, Sydney (AU)

(72) Inventors: Michael Fenech, Sydney (AU); Stephen Fenech, Sydney (AU)

(73) Assignee: VoiceByte Enterprises PTY LTD, Sydney (AU)

( * ) Notice: Subject to any disclaimer, the term of this patent is extended or adjusted under 35 U.S.C. 154(b) by 219 days.

(21) Appl. No.: 14/623,321

(22) Filed: Feb. 16, 2015

(65) Prior Publication Data

US 2015/0234821 A1   Aug. 20, 2015

Related U.S. Application Data

(60) Provisional application No. 61/940,730, filed on Feb. 17, 2014.

(51) Int. Cl.
| | |
|---|---|
| *G06F 7/00* | (2006.01) |
| *G06F 17/30* | (2006.01) |
| *H04L 29/08* | (2006.01) |
| *H04W 4/18* | (2009.01) |
| *H04W 4/02* | (2009.01) |

(52) U.S. Cl.
CPC .. *G06F 17/30041* (2013.01); *G06F 17/30038* (2013.01); *H04L 67/10* (2013.01); *H04W 4/185* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 8,311,875 | B1* | 11/2012 | Lloyd | G06Q 30/0241 |
| | | | | 705/7.29 |
| 2008/0090591 | A1 | 4/2008 | Miller et al. | |
| 2009/0216435 | A1 | 8/2009 | Zheng et al. | |
| 2011/0165888 | A1* | 7/2011 | Shuman | G06F 17/30041 |
| | | | | 455/456.1 |
| 2013/0204868 | A1 | 8/2013 | Singh | |
| 2013/0218968 | A1* | 8/2013 | McEvilly | G06Q 30/0261 |
| | | | | 709/204 |

FOREIGN PATENT DOCUMENTS

KR  1020090002317 A  1/2009

OTHER PUBLICATIONS

International Search Report and Written Opinion dated Aug. 31, 2015, in counterpart International Application No. PCT/IB2015/000444, by the International Searching Authority (11 pages).

* cited by examiner

*Primary Examiner* — Tuan A Pham

(74) *Attorney, Agent, or Firm* — Finnegan, Henderson, Farabow, Garrett & Dunner, LLP

(57) ABSTRACT

A system and method directed to geo-located audio, image, text and/or video content which may be characterized as content (audio, image, text, and/or video) that is accessed by one or more content consumers when such content consumers (or the associated content consumer devices) are physically located at a given geographic location and/or within a given vicinity (which may be fixed, predefined and/or programmable before or after uploading the content for access by content consumers) of the geographic location.

8 Claims, 8 Drawing Sheets

GEO-LOCATE SYSTEM AND TECHNIQUE

RELATED APPLICATION

This non-provisional application claims priority to U.S. Provisional Application No. 61/940,730, entitled "Geo-locate System and Technique", filed Feb. 17, 2014; this U.S. Provisional Patent Application is incorporated by reference herein in its entirety.

INTRODUCTION

At the outset, it should be noted that there are many inventions described and illustrated herein. In one aspect the present inventions are directed to systems and techniques to geo-locate audio, image, text and/or video content. Briefly, geo-located content may be characterized generally as content (audio, image, text, and/or video) that is accessed by one or more content consumers when such content consumers (or the associated content consumer devices) are physically located at a given geographic location and/or within a given vicinity (which may be fixed, predefined and/or programmable before or after uploading the content for access by content consumers) of the geographic location. The geo-located content is prepared, generated and/or compiled by a content creator and thereafter uploaded or broadcast to a backend computer system for access by one or more content consumers when such content consumers (or the associated content consumer devices) are physically located at a given geographic location and/or within a given vicinity of the geographic location.

Thus, in one aspect, the present inventions allows a geo-locate content creator to make available audio, image, text, and/or video content that is only accessible by content consumers (via, for example, a mobile interface such as, for example, a mobile telephone, tablet, computer or other consumer electronics device) when such content consumers are at a particular geographic location and/or within a predetermined range (which may be fixed or programmable) of the geographic location corresponding to that location of the geo-locate content creator.

Notably, this system and techniques of the present inventions may be, among other things, used and/or employed in systems for: advertising, information for tourist attractions, location based emergency messaging, Product or service information, and directions.

BRIEF DESCRIPTION OF THE DRAWINGS

The present inventions may be implemented in connection with embodiments illustrated in the attached drawings. These drawings show different aspects of the present inventions and, where appropriate, reference numerals illustrating like structures, components, materials and/or elements in different figures are labeled similarly. It is understood that various combinations of the structures, components, and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended reflect or indicate the embodiment(s) is/are "example" embodiment(s).

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed separately herein.

DETAILED DESCRIPTION

The present inventions relate to systems and techniques to geo-locate audio, image, text and/or video content. In the course of the detailed description to follow, reference will be made to content creator or content creator device, content consumer or content consumer device, and backend computer system.

Content creator or content creator device may be characterized or representative of a mobile device or interface such as, for example, a mobile telephone, tablet, computer (which may be part of or incorporated/embedded in a moveable platform (for example, automobile, boat or airplane)) or other consumer electronics device that may include wearable technology.

Content consumer or content consumer device may be characterized or representative of a mobile interface such as, for example, a mobile telephone, tablet, computer (which may be part of or incorporated/embedded in a moveable platform (for example, automobile, boat or airplane)) or other consumer electronics device that may include wearable technology.

Backend computer system may be characterized as one or more properly programmed computers and associated hardware/software configured in a computer server environment which communicates (for example, directly) with content creator and content consumer devices. The backend computer system is configured to or capable of receiving content uploads (from the content creator or content creator device) and given location of content creators. The backend computer system is also configured to or capable of delivering or providing content to content consumers or content consumer devices, for example, as per or in accordance with filter settings and geographical location of the consumers or consumer devices.

Figure 1A:
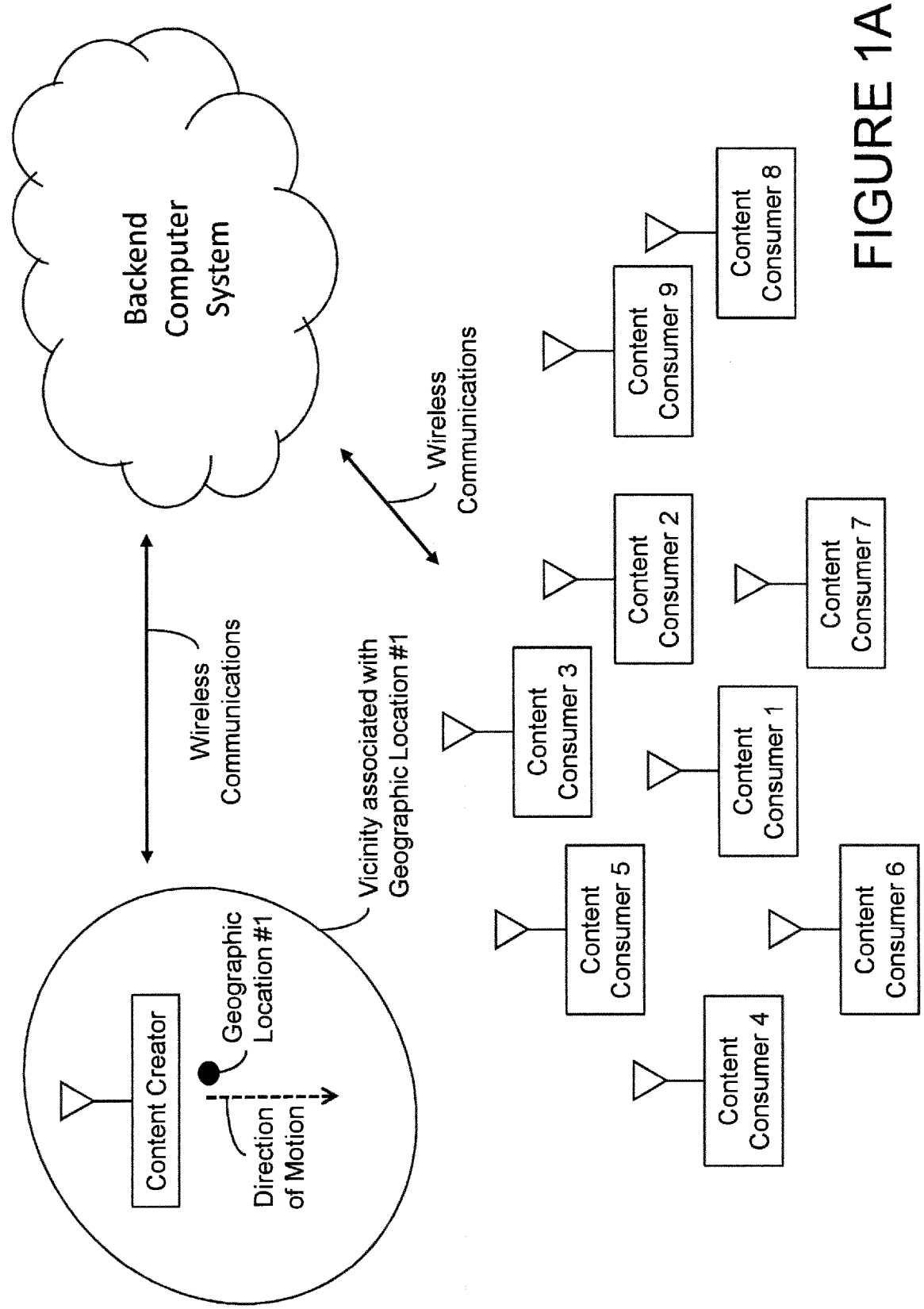
FIG. 1A-1G illustrate, in block diagram form, exemplary embodiments of aspects of the present inventions including content consumers, content creator(s) and a backend computer system; according to certain aspects and embodiments of the present inventions.

In one exemplary embodiment, one or more content creators generate, create and/or compile content via a mobile device and its mobile interface. (See, for example, FIG. 1A, wherein the content creator generates geo-located content corresponding to geographic location #1). In one embodiment, this is done by the content creator via the user interface of the content creator device (for example, via a hands free or key word spotting, or voice control for content creators, for example, who are driving or unable (or it is unsafe) to engage a user interface with one or more hands/fingers. The content generated, created, produced and/or compiled may include:
1. Audio
2. Video
3. Text
4. Images In one exemplary embodiment, the content creator inputs a clip title into the interface (for example, via voice or physical/virtual keyboard interfaces) to describe the content they would like to geo-locate. For example, in one embodiment, the content creator may attach one or more images or any length of video as well as input "text". The amount of text may be a predefined, fixed, variable or programmable length. Moreover, the temporal length of the content may be fixed, variable or programmable.

Figure 1B:
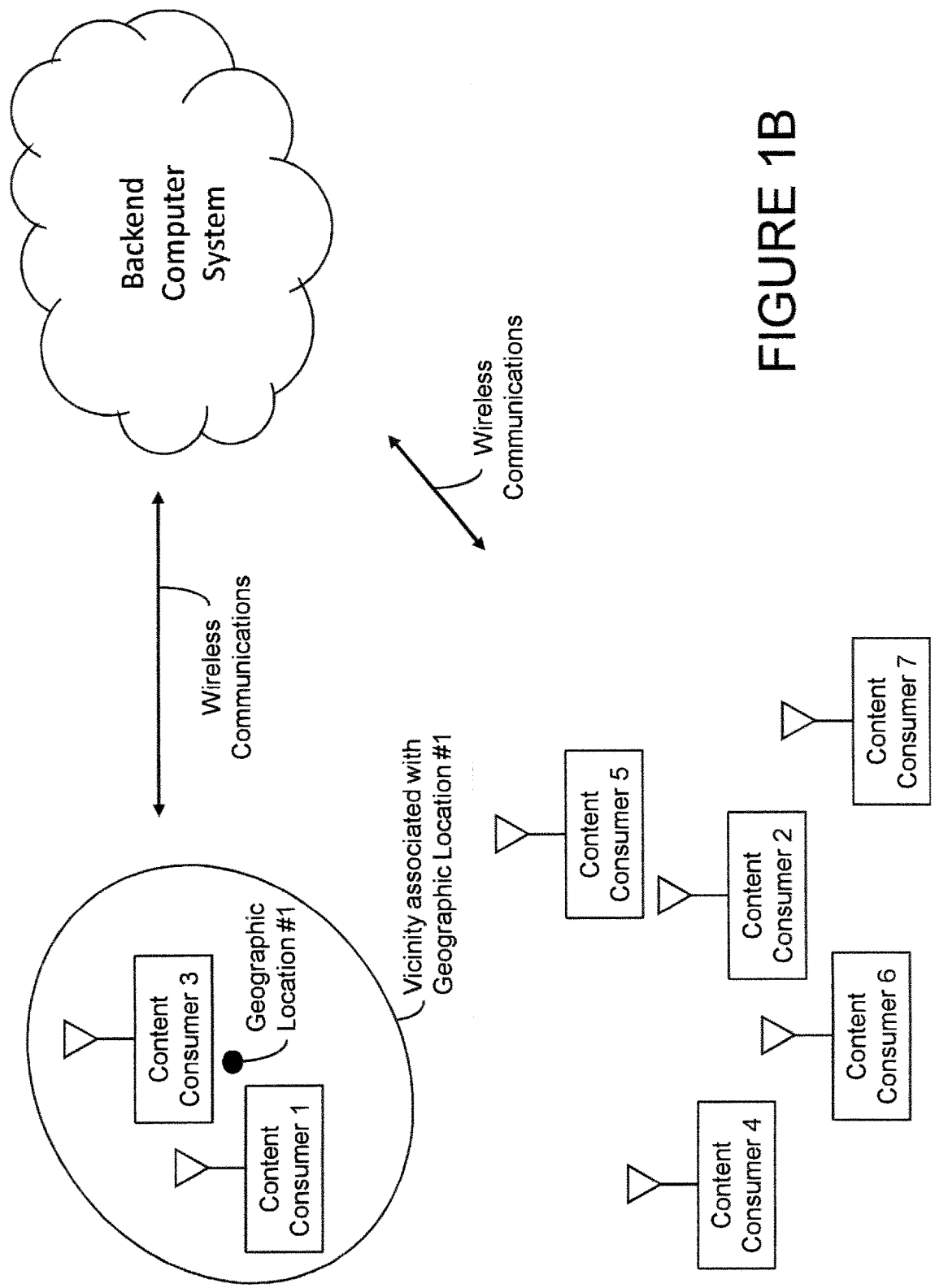
Figure 1C:
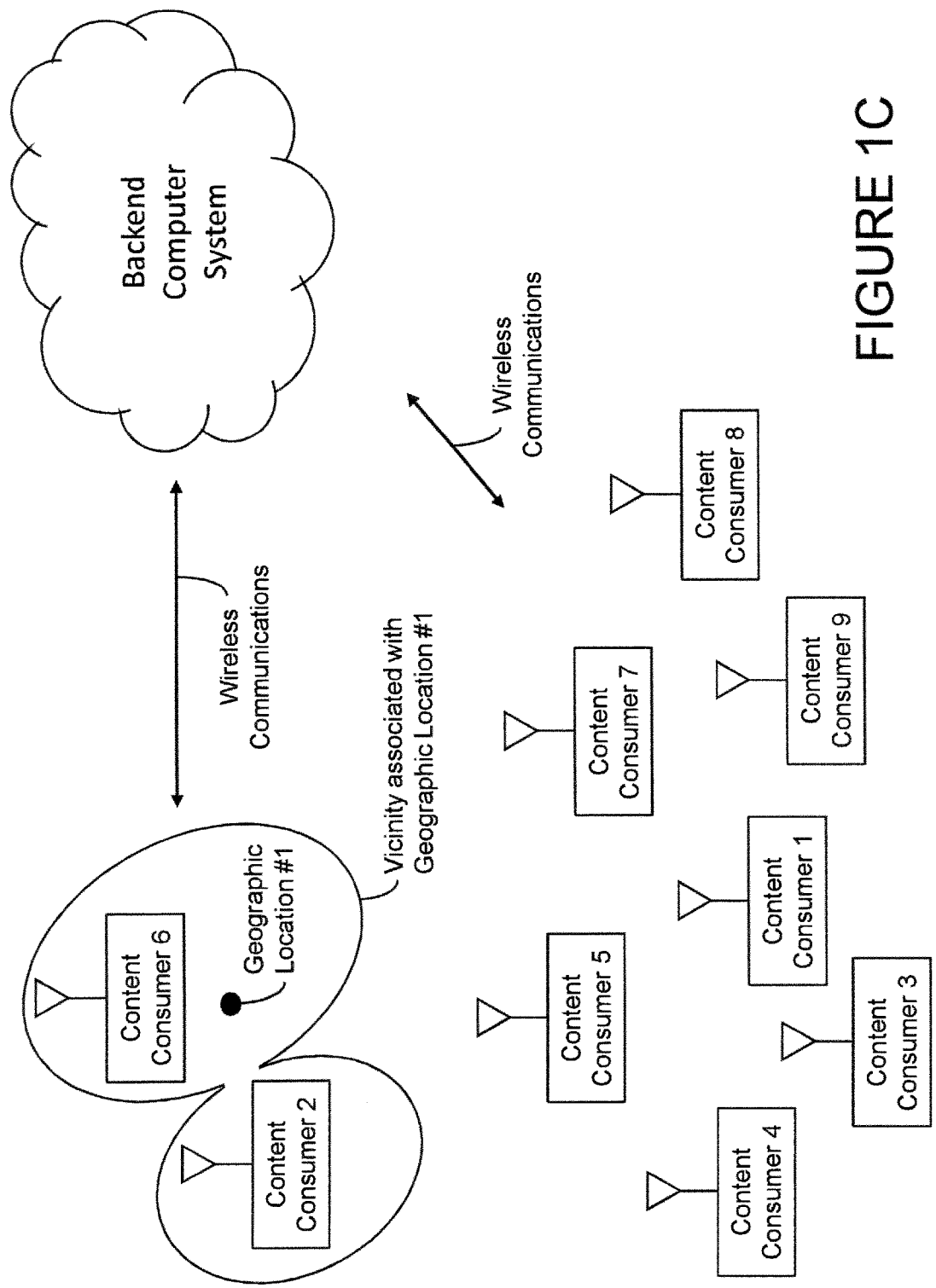
Figure 1D:
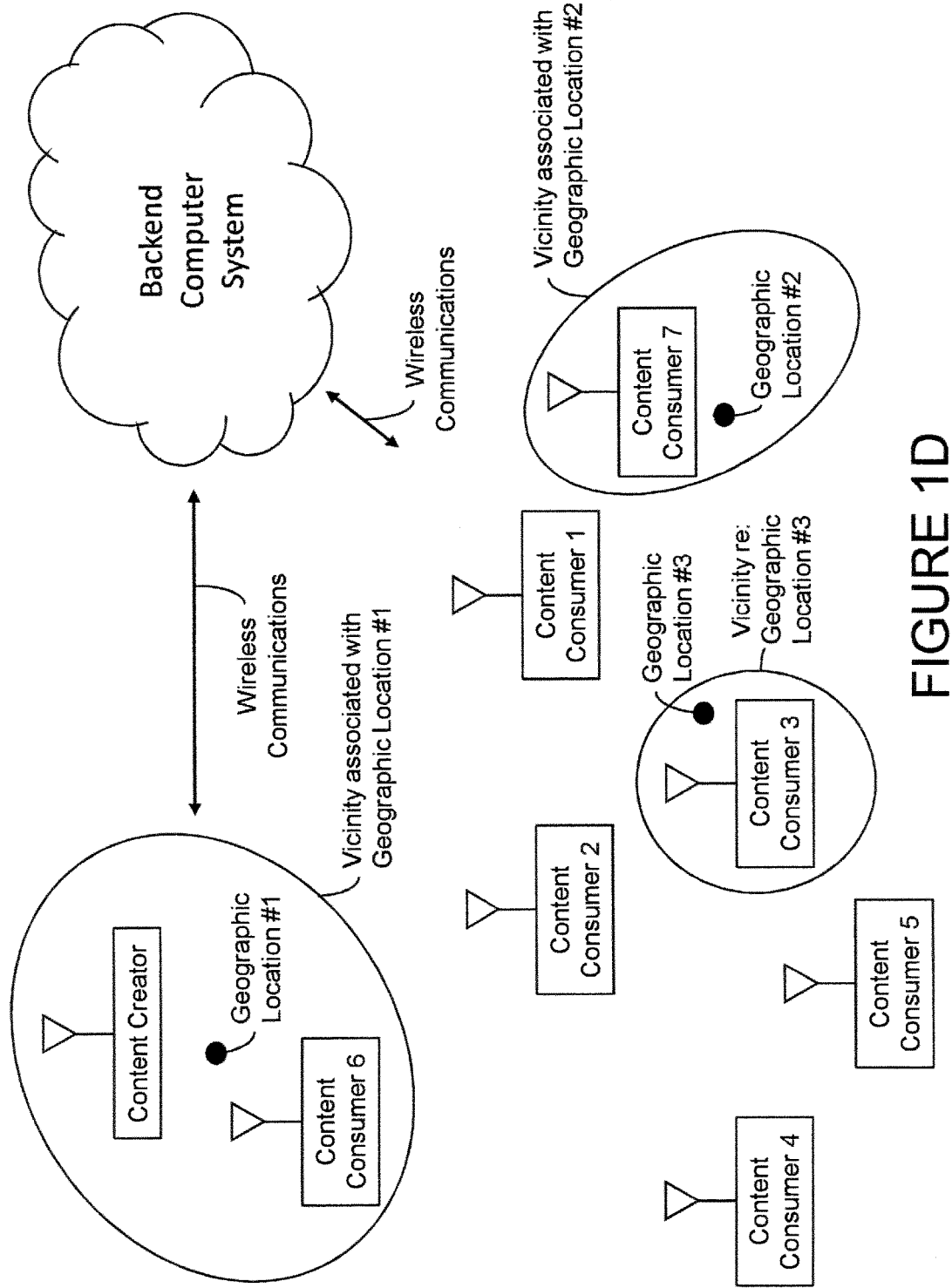

In the sharing options, the content creator may implement the geo-locate mode/operation via, for example, a geo-locate icon. Here, the sharing option of the geo-locate mode/operation limits consumption to those content consumers at the geographic location or in the vicinity thereof. That is, the content will only be consumed and/or available to those content consumers at the geographic location and/or in the vicinity (which may be programmable or fixed) of the geographic location of the content creator or as defined by the broadcaster. (See, for example, FIG. 1B, wherein content consumer 1 and content consumer 3 may access the geo-located content of geographic location #1). The content is accessible to content consumers as or when the content consumers (or the devices associated therewith) enter and/or are within the vicinity of the geographic location associated with the given geographic location. Notably, the "extent" of the vicinity which may be fixed, predefined and/or programmable/variable before, during or after the content creator creates/uploads the content for access by content consumers.

In one embodiment, a filter or content tags may be associated with the content. In this regard, the content creator (or backend computer system) "categorizes" the content according to a filter or content tags. As such, in operation, the content consumers, in addition to satisfying the geographic requirement (for example, being in the vicinity of the geographic location), must meet or match the filter or content tag settings before the content is accessible to the content consumer. That is, in operation when a particular content consumer enters and/or is at the geographic location or within the vicinity or area of the geographic location (the requirement of which may be defined by the content creator), that content consumer may receive or have access to certain content (which also may be content creator specific) subject to or provided that the filter settings or access of the content consumer device meets or matches the filter or content tags of the content from the content creator.

Notably, the content creator may enable or engage a filter or content tags on the front end (at the content creator device) to control or "limit" the content to particular content consumers. In addition thereto, or in lieu thereof, the content filter or content tags may be implemented at the backend computer system. Regardless, the transmit/content filter or content tags may be programmed and/or configured according to the following features or categories:
1. By Age
2. Gender
3. Country
4. Voice pattern
5. Language
6. Time of day
7. Device
8. Length of broadcast
9. Keyword
10. Location
11. Direction of travel
12. Speed of travel
13. Name—(geo-located private message)
14. Connection (friends)
15. Phone number
16. Paid content
17. Temperature
18. Altitude (for example in a building to determine the location of content between specific floors)
19. Calendar, Period and/or Length of time (content is available at a designated day/time and availability terminates or expires after a given time, period of time and/or day/time)
20. Range (meters or yards), for example, as discussed below.

The geographic location, and the vicinity associated therewith, may be determined by the physical or actual locale of the content creator or content creator device and/or a location/distance (area size) defined by the content creator. (See, FIG. 1A). In one embodiment, the geographic location is determined and provided by the content creator device as a geo-location tag, for example, upon content creation. In another embodiment, the backend computer system may determine the location of the content creator device via, for example, GPS data. Any technique, circuitry and/or system now known or later developed may be employed to identify and/or determine the geographic location of the content creator or content creator device.

Figure 1E:
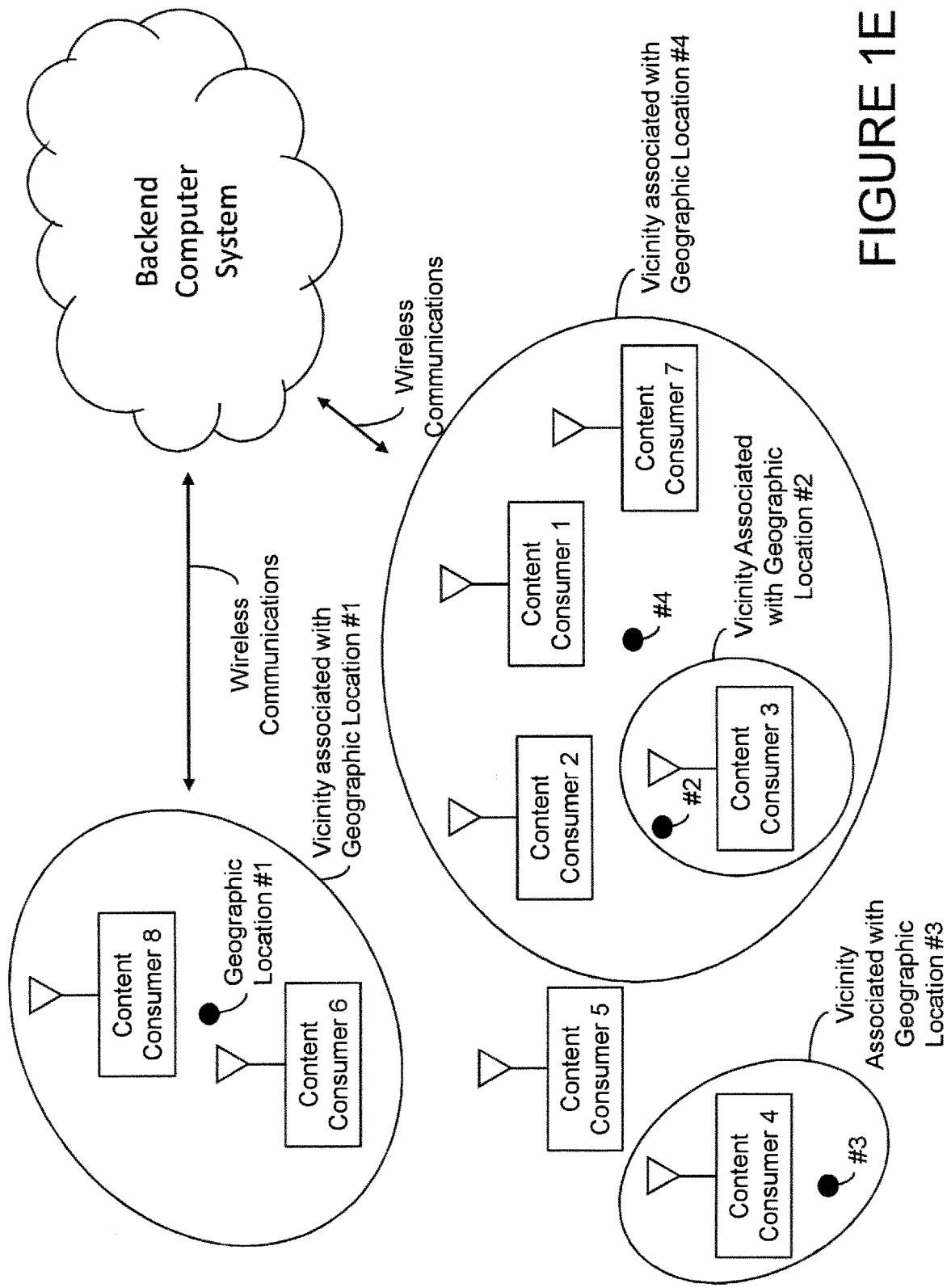

The vicinity or "extent" of the vicinity associated with a geographic location may be programmable or fixed and may take any geographic shape (for example, square, rectangular, trapezoidal, circular or elliptical) now known or later developed. (Compare the shapes of the vicinity associated with geographic locations, for example, FIGS. 1A-1D). The geographic location, and the vicinity associated therewith, may be within another vicinity of a geographic location. (See, FIG. 1E, geographic location #2 is within geographic location #4). Indeed, in one embodiment, the vicinity is established or defined, at least in part, by the content or focus of the content; for example, where the content or focus of the content is a structure or event located on or near a road, the vicinity may be a given distance around the structure or event (for example, a distance of 1 mile around the structure or event) as well as an additional mile along the road on which the structure or event is located on or near.

Figure 1F:
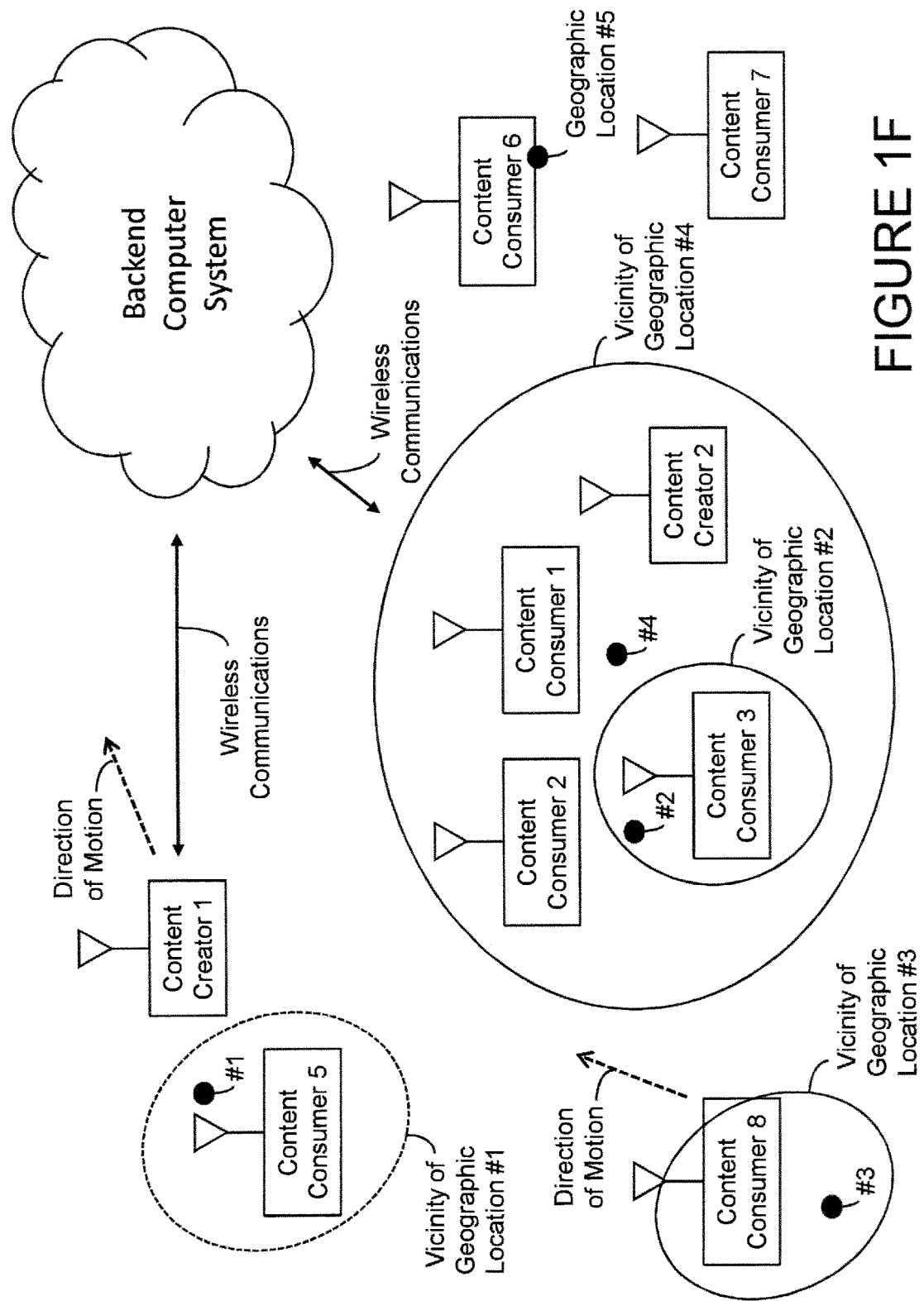
Figure 1G:
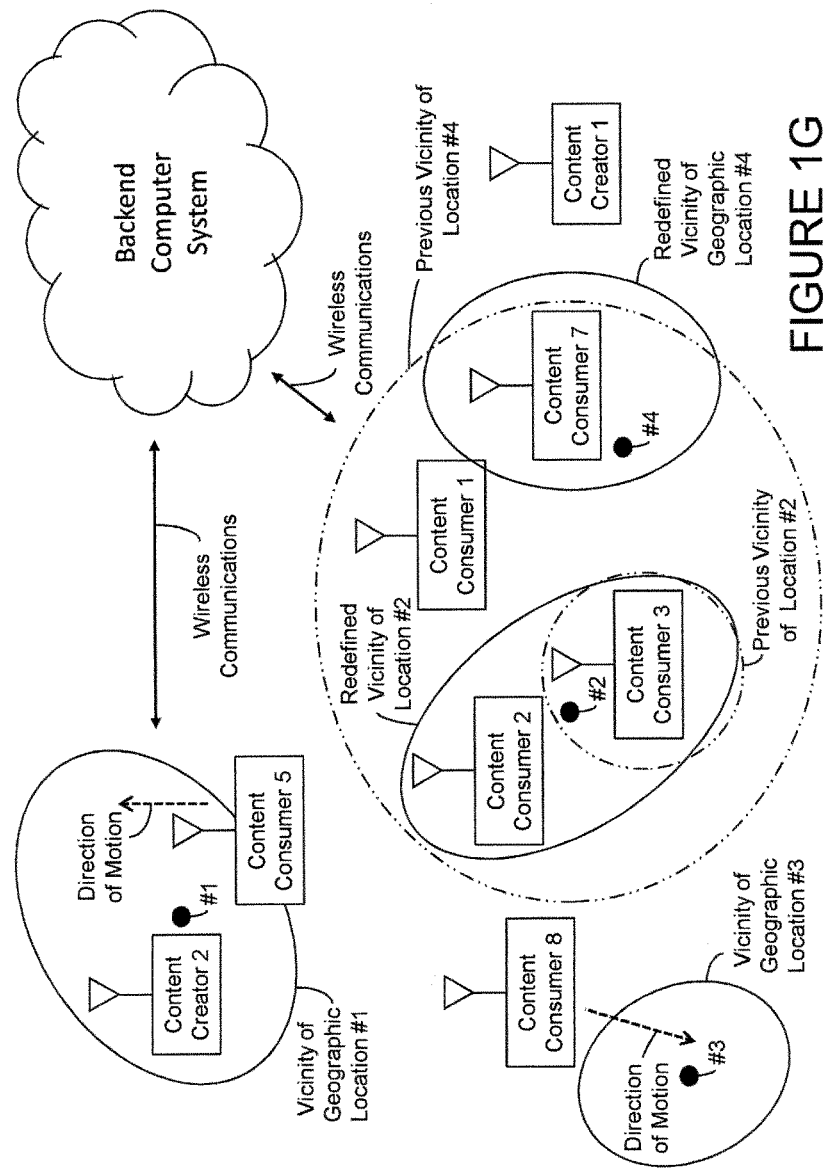

Notably, the geographic location (and/or vicinity thereof) of the broadcast may be defined during, immediately after, or a predetermined or controllable time after the creation of the content by the content creator. (See, for example, FIG. 1F wherein content creator 1 is not in the vicinity of the geographic location #1 when the content is being uploaded (as indicated by the dashed lines and the content creator 2 is in geographic location #4 when the content has been uploaded (as indicated by the solid line)). As such, the content creator may be at or near a particular geographic location when the content is uploaded or being uploaded, in the vicinity thereof, leaving the vicinity, or outside the vicinity when the content is uploaded or being uploaded (for example, it is uploaded after the content is created by the content creator and a predetermined or controllable relative to the geographic location and/or a predetermined or controllable time after the content creator has created the content). (See, for example, FIG. 1F wherein content creator 1 is outside the vicinity before the content regarding the geographic location #1 is being uploaded (as indicated by the dashed lines) and thereafter available to content consumers (for example, content consumer 5)). Indeed, the vicinity of the geographic location may be redefined after being initially defined. (See, for example, FIG. 1G wherein the vicinity of geographic location #2 and the vicinity of geographic location #4 are redefined as illustrated—thereby altering those consumers that may have access to given content).

In certain embodiments, the geographic location has no vicinity (the vicinity is zero) and, as such, a content consumer must be on or at the geographic location (whether or not for any given amount of time) before the content of a given content creator is available. (See, FIG. 1F, content consumer 6 and geographic location #5).

When the content is uploaded to the backend computer system (and in certain embodiments, acceptable by the backend computer system), the content is available for subsequent broadcast (to content consumers) automatically or in response to one or more content creator or computer operator inputs. For example, in one embodiment, the content creator uploads particular content to the backend computer system and such content may be immediately available for broadcast to content consumers. The content may be uploaded by the content creator via an input on a touch screen (of the content creator device) such as a tap on the left side of the bottom of the screen and slide their finger to the right to broadcast the content). In another embodiment, the content creator may upload the content to the backend computer system for broadcast to one or more content consumers via voice command.

The upload action by the content creator to the backend computer system may include one or more of the following:
1. Uploading action (or broadcasting by the content creator or content creator device) may be controlled via voice control (for example, content creator)
2. Uploading action (or broadcasting by the content creator or content creator device) may be set to occur at a specific time—whether relative or absolute
3. Uploading action (or broadcasting by the content creator or content creator device) may occur when the content creator enters or exits a specific geographic location
4. Uploading action (or broadcasting by the content creator or content creator device) may occur after the content creator has paid a fee Once instructed to upload or broadcast by the content creator, the content creator device may generate a database record which, in one embodiment, would also be uploaded (to the backend computer system (for example, the VoiceByte servers), in addition to the geographic location. The database record may include one or more of the following types of data:
1. Content
2. Clip title information—(title of the content which can include links, hash tags, and Twitter names)
3. Image (if one is attached)
4. Geo-location coordinates of the content creator or content creator device (for example, a geo-location tag).
5. Time and date the broadcast was created
6. Direction the content creator was facing
7. Direction of motion of the content creator
8. Speed/acceleration of the content creator; and/or
9. Voice data—happy, sad or angry voice patterns (natural language processing) of the content creator; this may be processed on the server side (i.e., at the backend computer system).

In one embodiment, the content is accessed by a content consumer or content consumer device for example, via the mobile interface (VoiceByte app) when the content consumer device is at the geographic location and/or in or within the vicinity of the geographic location. (See FIG. 1E wherein content consumers 6 and 8 may access content associated with geographic location #1, content consumer 3 may access content associated with geographic location #2 content consumer 4 may access content associated with geographic location #3, and content consumers 1, 2, 3 and 7 may access content associated with geographic location #4). In one embodiment, the geographic location of the content consumer is determined and provided by the content consumer device. In another embodiment, the backend computer system may determine the location of the content consumer device via, for example, GPS data. Any technique, circuitry and/or system now known or later developed may be employed to identify and/or determine the geographic location of the content consumer or content consumer device.

The content consumer may access the content associated within the geographic location or vicinity of a given geographic location until the content consumer departs from the geographic location and/or exits the vicinity of that geographic location. (See, for example, content consumer 8 and geographic location #3 in FIG. 1F). The content consumer may access the content immediately upon entering the geographic location and/or vicinity of the geographic location by way of push notifications or pulling the content from the backend computer system. (see, for example, content consumer 5 in FIG. 1G; wherein content consumer 8 may access the broadcast associated with geographic location #3 upon entering the vicinity of geographic location #3) or after the content is uploaded for broadcast by the content creator (see, for example, content consumer 5 in FIG. 1F wherein until the content from content creator 1 is uploaded (indicated by the dashed lines) the content is not available to content consumer 5).

In one embodiment, the content consumer accesses (for example, downloads), the geo-located content in connection with a fixed or programmable filter on the broadcast tab on the user interface. (Swiping left on the touch screen interface). For example, in those instances when the content consumer's filter is activated and the content includes filter or content tags, the app on the content consumer device executes or calls the API (application programming interface), which will then retrieve, and (if applicable display (in the apps interface)) the relevant creator generated content, that matches or meets their filter settings.

The content may be accessed by the content consumer via a number of ways, including, for example:
1. The content may be automatically downloaded when, for example, the content consumer is at a given geographic location and/or in the vicinity of a given geographic location;
2. The content may be downloaded when the content consumer is in the vicinity and the content meets or matches filtering requirements;
3. Access to the content may be controlled by the broadcaster;

4. Access to the content may be controlled by a particular point of interest in a geographic location (for example, the content consumer is driving a certain direction in relation to a particular point of interest in a geographic location);
5. Access to the content may be controlled by whether the content consumer wishes to purchase the content; and/or
6. The content consumer may be alerted via, for example, push notifications (from, for example, a backend computer system) that content at, near or in a vicinity of the geographic location of the content consumer is available for "consumption" or download—and, the content consumer may then retrieve that content.

The filter of or on the content consumer device may be programmed and/or configured according to the following and responsively may retrieve or access certain content (and, in one embodiment, thereafter display such content) in the following ways:

1. By Age
2. Gender
3. Country
4. Voice pattern
5. Language
6. Time of day
7. Device
8. Length of broadcast
9. Keyword
10. Location
11. Direction of travel
12. Speed
13. Name
14. Connection (friends)
15. Phone number
16. Paid content
17. Temperature
18. Altitude (for example in a building to determine the location of content between specific floors)
19. Particular content creator or creator(s)
20. Calendar, Period and/or Length of time (content is available at a designated day/time and availability terminates or expires after a given time, period of time and/or day/time)
21. Range (meters or yards), for example, as discussed below.

Notably, the content may also be available according to subscription or payment—for example, to paying consumers only. For example, a content consumer may subscribe to the content geo-located by a specific content creator.

Figure 2:
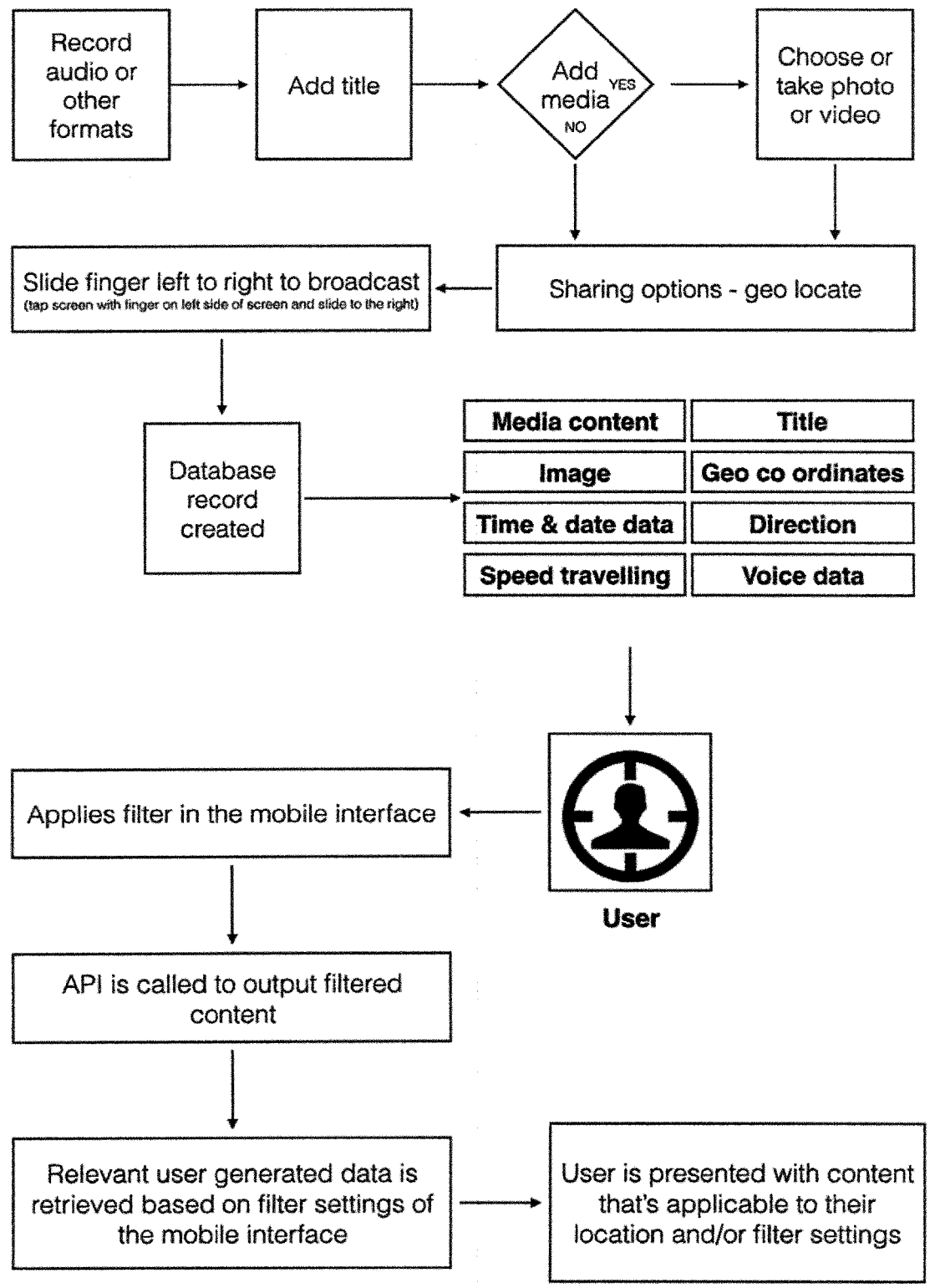
FIG. 2 is a flowchart of exemplary processes of a system operation, according to certain aspects of the present inventions.

The type of content that is accessible via payment include, for example:

1. Celebrity content
2. Retail discounts
3. Directions
4. Reviews
5. Tourist attraction information
6. Sales
7. Sport information
8. Real estate information An exemplary flowchart-like diagram of an exemplary embodiment of the present inventions is illustrated in FIG. 2. The flowchart-like diagram is merely exemplary. The present inventions may be implemented in accordance with other process flows.

Implementations or uses may include:

Advertising purposes—This use may allow retailers to target consumers within a predetermined location (for example, the vicinity of the geographic location) of one or more stores.

Information for tourist attractions—This application may allow content consumers access to creator generated content for such consumers to receive content about, for example, an attraction in, for example, their immediate or related area (that is related to the geographic location or the vicinity thereof).

Location based emergency messaging—This use may allow content consumers within a specific location to access warnings alerts/messages that are relevant to, for example, their or a related location (that is related to the geographic location or the vicinity thereof).

Product or service information—This use may be a source of content for consumers, which would allow consumers, for example, to make choices when making purchasing decisions.

Directions—The nature of being able to geo-locate content generated by a content creator may facilitate simple messages of assistance for content consumers to get a better understanding of their surroundings. For example, accessing a geo-located content creator generated audio message would help the content consumers to find a particular restaurant (for example, a favorite café).

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

Indeed, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those combinations and permutations are not discussed separately herein.

Many modifications, variations, combinations and/or permutations are possible in light of the above teaching. As such, the foregoing description of the exemplary embodiments of the inventions has been presented for the purposes of illustration and description. It is intended that the scope of the inventions not be limited solely to the description above.

Notably, reference herein to "one embodiment" or "an embodiment" means that a particular feature, structure, or characteristic described in connection with the embodiment may be included, employed and/or incorporated in one, some or all of the embodiments of the present inventions. The usages or appearances of the phrase "in one embodiment" or "in another embodiment" in the specification are not referring to the same embodiment, nor are separate or alternative embodiments necessarily mutually exclusive of one or more other embodiments, nor limited to a single exclusive embodiment. The same applies to the term "implementation." The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

Further, an embodiment or implementation described herein as exemplary is not to be construed as preferred or advantageous, for example, over other embodiments or implementations; rather, it is intended convey or indicate the embodiment or embodiments are example embodiment(s).

In the claims, the term "determine" and "calculate" and other forms thereof (i.e., determining, determined and the like or calculating, calculated and the like) means, among other things, calculate, assesses, determine and/or estimate and other forms thereof. Further, the term "determine" and other forms (i.e., determining, determined and the like) means, among other things, calculate, assesses, determine and/or estimate and other forms thereof. Further the term " " means, In addition, the terms "first," "second," and the like, herein do not denote any order, quantity, or importance, but rather are used to distinguish one element from another. Moreover, the terms "a" and "an" herein do not denote a limitation of quantity, but rather denote the presence of at least one of the referenced item. Further, the term "data" may mean, among other things, a current or voltage signal(s) whether in analog or a digital form (which may be a single bit (or the like) or multiple bits (or the like)).

As used in the claims, the terms "comprises," "comprising," "includes," "including," "have," and "having" or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of creating and uploading geo-located content by a content creator on a content creator device, wherein the content includes audio, images, text and/or video, the method comprising:
    enabling a geo-locate mode on the content creator device;
    defining one or more content tags to associate with the geo-located content;
    generating the geo-located content, after enabling the geo-locate mode, wherein the geo-located content is associated with a geographic location;
    determining geo-location data associated with the geo-located content wherein the geo-location data is representative of geographic coordinates of the geographic location;
    uploading the geo-located content, the one or more content tags, and the associated geo-location data of the geographic location to a backend computer, wherein the content tags are independent of the geographic location, and the geo-located content is only accessible to one or more content consumer devices when the one or more content consumer devices are physically located at or in a vicinity of the geographic location associated with the geo-located content and when the one or more content tags meet one or more associated filter settings of the one or more content consumer devices; and
    downloading the geo-located content associated with the geographic location to the one or more content consumer devices only when the one or more content consumer devices are physically located at or in a vicinity of the geographic location associated with the geo-located content and when the one or more content tags associated with the geo-located content meet the one or more associated filter settings of the one or more content consumer devices,
    wherein the one or more content tags include a period of time tag, the period of time tag defining when the geo-located content is available.

2. The method of claim 1, wherein the period of time tag further defines for how long the geo-located content is available.

3. The method of claim 1, wherein the one or more content tags further include a content consumer tag, the content consumer tag defining a particular content consumer.

4. The method of claim 1, wherein the one or more content tags further include a direction of travel tag, the direction of travel tag defining a direction of travel of the content consumer device.

5. The method of claim 1, wherein the one or more content tags further include at least one of age, gender, and language tags.

6. The method of claim 1, wherein the one or more content tags further include a device tag, the device tag defining the manufacturer, brand, or operating system of the content consumer device.

7. The method of claim 1, wherein the one or more content tags further include a payment tag, the payment tag defining an amount of payment required in order to access the geo-located content.

8. A method of creating and uploading by a content creator on a content creator device and receiving and downloading geo-located content by a content consumer on a content consumer device, wherein the content includes audio, images, text and/or video, the method comprising:
    enabling a geo-locate mode on the content creator device;
    defining one or more content tags to associate with the geo-located content, wherein the content tags are independent of a geographic location;
    generating first geo-located content, after enabling the geo-locate mode, wherein the first geo-located content is associated with a first geographic location;
    determining geo-location data associated with the first geo-located content wherein the geo-location data is representative of geographic coordinates of the first geographic location;
    uploading the first geo-located content, the one or more content tags, and the associated geo-location data of the first geographic location to a backend computer, wherein the first geo-located content is only accessible to one or more content consumer devices when the one or more content consumer devices are physically located at or in a vicinity of the first geographic location associated with the first geo-located content and when the one or more content tags meet one or more associated filter settings of the one or more content consumer devices;
    enabling a geo-locate mode on the content consumer device wherein the geo-locate mode allows the content consumer device to receive geo-located content;
    physically locating the content consumer device at a second geographic location associated with second geo-located content;

defining one or more filter settings of the content consumer device, wherein the one or more filter settings are independent of a geographic location; and downloading the second geo-located content associated with the second geographic location to the content consumer device only when the content consumer device is physically located at or in a vicinity of the second geographic location associated with the second geo-located content and when the one or more content tags associated with the second geo-located content meet the one or more associated filter settings of the content consumer device, wherein the one or more content tags include a period of time tag, the period of time tag defining when the geo-located content is available.

\* \* \* \* \*